United States Patent

[11] 3,634,613

[72] Inventor Dennis G. Abel
Hanover Park, Ill.
[21] Appl. No. 27,554
[22] Filed Apr. 13, 1970
[45] Patented Jan. 11, 1971
[73] Assignee Zenith Radio Corporation
Chicago, Ill.

[54] AUTOMATIC CONTRAST CONTROL
8 Claims, 2 Drawing Figs.

[52] U.S. Cl. .......... 178/5.4 R, 178/7.5 DC
[51] Int. Cl. .......... H04n 9/12
[50] Field of Search .......... 178/7.3 DC, 7.5 DC, 5.4; 325/404

[56] References Cited

UNITED STATES PATENTS

| | | | |
|---|---|---|---|
| 3,322,895 | 5/1967 | Loughlin .......... | 178/7.5 DC |
| 3,109,989 | 11/1963 | Muir .......... | 178/7.3 DC |
| 2,606,247 | 8/1952 | Fyler .......... | 178/7.5 DC |
| 2,810,825 | 10/1957 | Keizer et al. .......... | 178/7.5 DC |
| 2,989,588 | 6/1961 | Thomas, Jr. .......... | 178/7.3 DC |

*Primary Examiner*—Richard Murray
*Attorneys*—Donald B. Southard and John J. Pederson

ABSTRACT: An automatic contrast control circuit for a color television receiver for stabilizing contrast level when switching between channels having different modulation levels or types of scene being televised. The control circuitry contemplates the provision of an added signal input to the automatic gain control (AGC) system of the receiver nominally providing an output control voltage responsive to the level of received carrier strength to selectively control the amplification levels of certain of the receiver's initial amplifier stages. The automatic contrast control circuitry includes a storage device for developing an additional control potential at the cathode of the AGC amplifier and a voltage-dependent, variable impedance device, such as a transistor, connected in parallel with the storage device and coupled to a source of signals in the luminance channel of the receiver. Signals representative of the level of contrast variations in the luminance information are thereby applied to the input of the transistor so as to selectively control the conduction thereof and, in turn, the charge level maintained by the associated storage device.

PATENTED JAN 11 1972

3,634,613

Inventor
Dennis G. Abel
By [signature]
Attorney

AUTOMATIC CONTRAST CONTROL

BACKGROUND OF THE INVENTION

The present invention relates in general to improvements in television receivers and more particularly to automatic contrast control circuitry for stabilizing the current representing average contrast level of luminance information developed in the receiver when switching between channels having different modulation levels or during scene changes so as to preclude "blooming" during high contrast and brightness operation as well as insuring the maintenance of correct output gamma relationship in the reproduced image.

In both color and monochrome television receivers, the beam current generated in the cathode-ray tube is dependent upon the contrast and brightness adjustments of the receiver and the amplitude of the alternating current (AC) components comprising the luminance information. The latter, in turn, is representative of the specific transmitted image to be reproduced. Typically, the receiver is adjusted on an average-modulated signal for relatively high contrast and maximum "usable brightness" without "blooming." These conditions produce a nominal beam current in the cathode-ray tube that is within safe operational limits for the receiver. For brief periods of time, the cathode-ray tube can tolerate instantaneous beam currents higher than the intended design limits, such as those resulting from large amplitude AC components present in white highlights. However, if the average beam current remains at such increased levels over an extended period of time, the power dissipation capabilities of the tube may be exceeded with the expected consequences. In addition, the high-voltage power supply during instances of high beam current may be incapable of delivering the required beam current. Such overloading reduces the power supply output voltage and results in undesirable raster "blooming." That is, there will be a loss of brightness, reduction of horizontal width, and severe defocusing of the reproduced image. Moreover, component malfunction is a possibility. The problem in this regard has been further compounded by the new-generation, high-brightness cathode-ray tubes which require higher beam currents in order to illuminate the tube to its fullest capability during high-modulation (white) scenes. In view of the added demands on the high-voltage power supply, some method for effectively limiting the average cathode-ray beam current is required.

One method, the brightness limiter, limits the average beam current by sampling a current in the receiver known to be directly proportional to the beam current. By limiting the average level of the sample current to a level observed to result in a maximum allowable beam current, a safe upper limit can be imposed on the average beam current. By limiting the average beam current, however, image reproduction standards may not be maintained in all instances. For example, if the AC components in the processed luminance signal become very large, as in a scene with very bright sunlight, the resultant average beam current may reach a level requiring limiter action to remain within design limits. However, if the direct current (DC) components of the luminance signal representing black level are not maintained at a fixed level relative to cathode-ray tube cutoff, the AC components may well reach a level where "blacks" are forced below the cutoff of the cathode-ray tube and grays in turn being reproduced as blacks. If the image is to be accurately reproduced in the low-light (gray) areas, a manual reduction of contrast is needed. When the scene switches to one having low-amplitude AC components, such as a dark basement scene, the average beam current is now no longer limited, but instead drops to a point below the safety level. Since the amplitude of the AC components (contrast) previously was manually reduced on the high brightness scene, the low brightness scene will now appear to lack contrast.

This situation is not alleviated, indeed it is worsened, by the addition of DC coupling or DC restoration in the luminance channel to maintain constant black level while brightness is limited. Since DC restoration clamps the black level at a reference potential, grays are eventually crushed to black level resulting in an incorrect gamma relationship. That is, in the luminance information, the component amplitudes representative of elemental areas, which may range from black to white depending upon the image content, are varied in different proportions. Once again, the image appears to have too much contrast. Readjustment of contrast may also be necessary, if channels are switched from one of high modulation to one of low modulation, or vice versa. Consequently, although receiver circuitry has been protected, the quality of the reproduced image has not been maintained at the desired optimum.

SUMMARY OF THE INVENTION

Accordingly, it is an object of the invention to provide new and improved circuitry for controlling automatically the contrast in a television receiver which overcomes the aforenoted disadvantages and deficiencies of prior circuits.

A more particular object of the invention is to provide an improved automatic contrast control circuit which effectively prevents defocusing and/or "blooming" of the reproduced image of a television receiver during reception of sustained high-level modulated signals.

Another object of the invention is to provide an improved automatic contrast control circuit of the foregoing type wherein a correct gamma relationship is maintained for the reproduced image despite variations in modulation levels in the luminance information with black level being clamped at a reference potential.

In accordance with the present invention, an automatic contrast control circuit is provided for maintaining a substantially constant level of average contrast despite varying signal conditions in a color television receiver which includes an automatic gain control system of the keyed or pulse-gated type. The AGC system nominally includes an amplifier device such as an electron discharge device having an input responsive to the signal carrier strength level of the received signal to develop a control voltage for the selective control of the respective amplification level of the tuner and IF stages. The automatic contrast control circuitry of the present invention contemplates means for developing and applying still a second input control signal to the AGC system to provide further control of the tuner and IF stages amplification levels in accordance with the level of video content, or contrast, in the processed signal. In the preferred embodiment, this is accomplished by a storage capacitor interposed in the cathode circuit of the AGC amplifier acting as a second control electrode. The charge-discharge rate of the capacitor determines the level of unidirectional potential maintained at the cathode. The charge level of the capacitor is essentially controlled by its discharge path consisting of a fixed impedance in parallel with a voltage-dependent, variable impedance element, such as a transistor. The transistor is, in turn, coupled to a source of composite video signals whereby the level of video content constitutes the input signal and thereby its conductive level.

BRIEF DESCRIPTION OF THE DRAWING

The features of this invention which are believed to be novel are set forth with particularity in the appended claims. The invention together with its further objects and advantages thereof, may be best understood, however, by reference to the following description taken in conjunction with the accompanying drawing, in which like reference numerals refer to like elements in the several figures and in which:

PREFERRED EMBODIMENT OF THE INVENTION

Figures 1, 2:
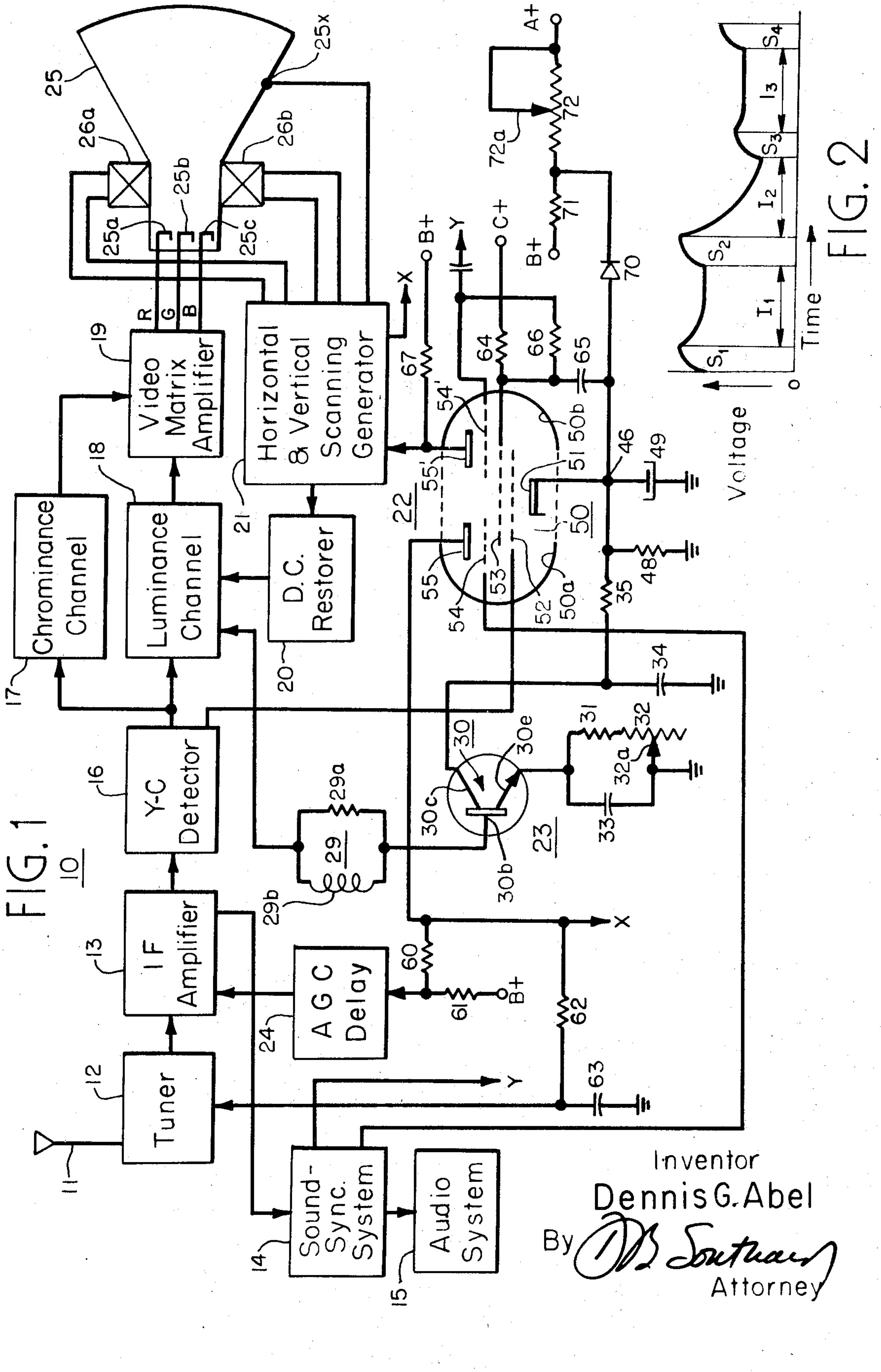
FIG. 1 is a combined schematic and block diagram of a television receiver which includes automatic contrast control circuitry in accordance with one embodiment of the invention.
FIG. 2 is a graphic representation of waveforms useful in understanding an operational feature of the invention.

Referring now to the drawing, a color television receiver 10 is shown schematically which includes automatic contrast control circuitry in accordance with the present invention. The receiver includes an antenna 11 coupled to an input tuner stage 12 which amplifies the received signal and converts the same to an intermediate frequency in the well-known manner. The amplified and converted signal is coupled to an intermediate-frequency amplifier 13 where it is further amplified and then coupled to sound-sync system 14, and also to a luminance (Y) and chrominance (C) detector 16. Sound-sync system 14, in turn, connects to an audio system 15 having appropriate circuitry for reproducing the audio portion of the received signal. The sound-sync system 14 is further coupled to automatic gain control circuitry 22 providing it with an input signal representative of carrier strength variations. The automatic gain control circuitry 22, which is connected directly to the tuner 12 and through an AGC delay network 24 to the IF amplifier 13, is effective to selectively control their respective amplification gains in accordance therewith.

Sound-sync system 14 further connects to horizontal and vertical scanning generators 21 which also includes the usual high-voltage supply for the second anode 25x of the image reproducer or cathode-ray tube 25. Appropriate scanning signals are developed in the horizontal and vertical scanning generators 21 which, upon application to appropriate deflection yokes 26*a* and 26*b* positioned about the image reproducer 25, reproduces the televised image in the conventional manner. The image reproducer 25 may be a conventional shadow mask cathode-ray tube comprising a tricolor image screen or target (not shown) to be selectively scanned by a group of three electron beams developed by individual guns within the tube, the cathodes of which are represented at 25*a*, 25*b* and 25*c*. The three cathodes are connected to a video matrix amplifier network 19 from which the various chrominance and luminance information is processed and applied thereto. In the embodiment of the receiver as herein shown, the color signals R, G and B are applied directly to the cathodes 25*a*, 25*b* and 25*c*, respectively. It should be understood, however, that other systems are equally compatible, such as those receivers designed to utilize color difference signals. The type of chroma processing is not directly related to the subject matter of the present invention and is in no way critical to its operation.

The Y–C detector 16 is connected to a chrominance channel 17 for developing the chrominance signals which are applied to the video matrix 19 as one of the informational inputs thereto. Detector 16 is likewise connected to the luminance channel 18 wherein the direct current (DC) components of the luminance signal, representing black level, are maintained at some predetermined, but substantially fixed level by a DC restorer 20 coupled to the luminance channel. The DC restorer 20 is, in turn, connected to the horizontal and vertical scanning generator 21 which provides pulses to gate the restorer to conduction during the horizontal retrace time thereby preventing conduction on noise during the forward scan time. The processed luminance signals are applied to the video matrix network 19, forming the other of its informational inputs. Appropriate matrixing occurs within matrix 19 such that signals containing the correct brightness, hue and color saturation information are derived and applied to the appropriate control electrodes of the image reproducer 25 in a manner understood in the art.

As thus far described, the receiver is conventional in general construction and operation such that further and more particular operational description should not be necessary. More particular consideration, however, may now be given to that portion of the receiver 10 which relates to the preferred embodiment of the present invention, and in general constitutes automatic contrast control circuitry in conjunction with the AGC system such as identified generally at 22.

The AGC, or automatic gain control, circuitry 22 may be of the keyed or pulse-gated type which in one embodiment includes a dual-pentode amplifier 50 having a first section 50*a* forming an amplifier or gain control action and a second section 50*b* which may, for example, serve as a sync clipper. As indicated, the separate sections 50*a* and 50*b* share in common a screen electrode 53, a common control electrode 52 and a common cathode 51, but have individual suppressor electrodes 54 and 54′ and plate electrodes 55 and 55′, respectively.

Operationally, resistors 60 and 61, interconnected as shown between a source of potential (B+) and the plate 55, effect a unidirectional potential at the latter just below the threshold potential required for conduction. As will be understood, the AGC section 50*a* will accordingly be driven to conduction by gating pulses at the horizontal frequency rate developed in the scanning generator network 21 and applied to the plate 55 through a circuit formed by connecting points X together. The resultant output gain control voltage developed at the plate 55 is coupled to the tuner 12 through a resistance 62, which resistance is suitably bypassed to ground by capacitor 63. In addition, this control voltage is also applied to the IF amplifier 13 through AGC delay circuit 24, as indicated. Common screen electrode 53 of amplifier 50 is maintained at a substantially constant potential by a resistor 64 connected to a source of unidirectional potential (C+). A capacitor 65 in conjunction with an additional capacitor 49 serves to bypass screen 53 to ground, the interconnection point thereof forming a junction 46. A resistance 66 interconnects common screen electrode 53 and the suppressor electrode 54′ of tube section 50*b*.

As indicated by the use of a common legend Y to designate a common circuit connection, composite video signals are AC coupled from the sound-sync system 14 to the suppressor electrode 54′ of the tube section 50*b* comprising a sync clipper for further processing. The plate electrode 55′ of the sync clipper tube section 50*b*, in turn, is connected to a source of B+ by a load resistor 67. Accordingly, separated sync signals are generated by tube section 50*b* and applied to the horizontal and vertical scanning generators 21.

As will also be readily understood, an input signal representative of variations in received signal carrier strength, as denoted by fluctuations in sync pulse amplitude, is coupled from the sound-sync system 14 to the suppressor electrode 54 of tube section 50*a*. If such signal information indicates essentially nonvarying carrier strength, current conduction through tube section 50*a* providing gain control action is not altered thereby resulting in an output control voltage at its associated plate electrode 55 which upon application to the tuner and the IF stages 12 and 13, respectively, maintains the quiescent amplification levels of the associated amplifier devices. However, when the carrier strength of the received signal varies, the output control voltage appearing at the plate 55 is effective to adjust the tuner 12 and IF 13 amplification levels so as to maintain substantially constant sync pulse amplitude, or carrier level, appearing at the Y–C detector 16. Noise cancellation is also effected in the AGC system 22 and is accomplished by the application of negative-polarity composite video signals to the common control electrode 52 of tube 50. The result is to minimize the occurrence of any noise-induced gain control output voltages or false synchronization.

As shown, the common cathode 51 of dual-section pentode 50 is returned to ground through a network consisting of parallel connected resistor 48 and capacitor 49. Capacitor 49 is charged during the sync interval of the received signal to a level determined, for the most part, by current conducted through the sync clipper tube section 50*b*. During the nonconduction period, or image interval of the signal, capacitor 49 discharges at a rate determined by the impedance present in its discharge path from junction 46 to ground. As illustrated in FIG. 2, if the total impedance remains substantially fixed and constant, capacitor 49 follows the charge-discharge cycle of sync interval $S_1$ and image interval $I_1$. The component values for resistance 48 and capacitor 49 are selected to provide a long RC (discharge) time constant, and as a result, cathode 51 will be maintained at a predetermined level of unidirectional potential.

In accordance with the present invention, automatic contrast control circuitry, a portion being identified generally at 23, is provided which, in conjunction with the circuitry of AGC system 22, is effective to maintain the average current representative of contrast at a substantially constant level despite variations in modulation levels of the received signal. The circuitry 23 comprises a transistor 30 interconnected between a point in the luminance channel and common cathode 51 of the pentode amplifier 50. Transistor 30 has a collector electrode 30*c* connected to cathode 51 at junction 46 through a limiting resistance 35 and suitably bypassed to ground by a capacitor 34. Transistor 30 includes an emitter electrode 30*e* returned to a reference potential, or ground, through serially connected resistances 31 and 32. Resistance 32 is of the adjustable type having its movable tap arm 32*a* connected directly to ground. A capacitor 33 provides the bypass action for emitter electrode 30*e*. Accordingly, it will be noted that an additional but variable impedance is placed in parallel with that of resistor 48 and consists of the instantaneous value between collector and emitter electrodes of transistor 30 and the values of resistances 31 and 32. The instantaneous impedance value presented by transistor 30 is of course dependent upon its conduction level at any particular time. A variation in the impedance as presented by transistor 30 will vary the total resistance through which capacitor 49 will discharge, since resistor 48 is of a fixed value. If the total discharge resistance decreases, capacitor 49 will discharge more rapidly, as indicated at the termination of image interval $I_2$ in FIG. 2. During sync interval $S_2$, capacitor 49 will recharge at its previous rate, but of course will not reach the same level of charge. The resultant average potential at cathode 51 will therefore be somewhat decreased in magnitude. Conversely, if the total discharge resistance had increased, the potential at cathode 51 would have likewise increased, as illustrated graphically during sync and image intervals $S_3$ and $I_3$ in FIG. 2.

To prevent the AGC system 22 from overloading, such as when modulation is substantially reduced at the station transmitter, a diode 70 is connected from the common cathode 51 to the junction of a fixed resistance 71 and variable resistance 72 serially connected between source B+ and a source of potential (A+) and forming a voltage divider network. By adjusting resistance 72 to a selected value, the threshold voltage necessary for diode conduction can be readily varied. As the potential of cathode 51 approaches the selected diode threshold voltage, it is clamped to that point by conduction of diode 70 and cannot become more positive, thereby preventing any overloading condition.

In operation, the base electrode 30*b* of transistor 30 is connected to a source of DC restored, composite video signals in the luminance channel 18 by the coupling and isolation network 29 formed by a resistance 29*a* and inductance 29*b* connected in parallel as shown. The signal information coupled through network 29 to the base 30*b* provides the operating bias for transistor 30. Since in the composite video signal "black level" is maintained at a fixed reference potential by the DC restorer 20, any variations in the bias at base electrode 30*b* will be directly proportional to any variations in the level of alternating current (or contrast) which also forms a part of the luminance information. Accordingly, it will be appreciated that upon an increase in the signal information applied to the base 30*b* of transistor 30 due to higher contrast levels, transistor 30 will be forced to a higher conduction level effecting a lower output impedance, that is, a lower impedance as measured between its collector and emitter electrodes 30*c* and 30*e*. Conversely, transistor output impedance increases upon the occurrence of lower contrast levels since the applied signal at base 30*b* must decrease causing transistor 30 to conduct less.

Since the collector-emitter circuit of transistor 30 is interposed in the additional signal path in parallel with fixed resistance 48, it will be seen that the conduction level thereof has a direct influence on the level of potential developed and applied by capacitor 49 to the common cathode 51 of tube 50. That is, the conduction level of transistor 30 at any particular time determines the total resistance through which the capacitor 49 may discharge during the image interval of the composite video signal. As previously pointed out, it is the sequential discharge rates effected for capacitor 49 which determines the particular level of steady-state, or averaged, potential developed at cathode 51, as depicted and described in reference to FIG. 2. In this sense, the level of cathode potential provides a second input control voltage to the AGC system 22. The first is effected at suppressor electrode 54 in the form of appropriate signal information from sync and sound detection stage 14. Such gain control system nominally develops and applies an output control voltage to certain of the receiver's preamplifier stages, such as the RF amplifier in tuner stage 12 and one or more amplifiers in IF amplifier stage 13, so as to selectively control the amplification levels thereof in response to the magnitude of the carrier of the received signal.

With an additional input control voltage applied to the cathode 51 of tube 50, the magnitude of which being a function of the level of AC components (or contrast in the luminance information, an output signal is effected by AGC amplifier section 50*a* directly related to both carrier strength and the level of contrast in the image intervals of the composite video signal. Carrier strength is effectively maintained as before but, in addition, an output is provided at the Y–C detector 16 wherein the average current representative of contrast is maintained at a fixed and substantially constant level notwithstanding substantial variations in modulation levels between stations as well as other factors that may otherwise affect contrast level. The result is that beam current within the cathode-ray tube is effectively held within desired limits, objectionable picture "blooming" is prevented under certain abnormal signal conditions, and the correct gamma relationship is maintained in the reproduced image at all times to assure the quality of the picture presentation remains at the desired optimum.

The embodiment as disclosed herein is essentially similar to the circuitry of a commercialized version of the invention. Circuit impedance values and other parameters are set forth below. It is to be understood, however, that such are set forth purely by way of illustration and not as limitations thereon.

| | | |
|---|---|---|
| source A+ | volts | +24 |
| source B+ | volts | +250 |
| source C+ | volts | +390 |
| resistor 29*a* | ohms | 2.2K |
| inductor 29*b* | microhenrys | 65 |
| resistor 31 | ohms | 100 |
| potentiometer 32 | ohms | 1K |
| capacitor 33 | microfarads | 0.22 |
| capacitor 34 | microfarads | 0.1 |
| resistor 35 | ohms | 470 |
| resistor 48 | ohms | 15K |
| capacitor 49 | microfarads | 4 |
| resistor 60 | ohms | 39K |
| resistor 61 | ohms | 2.2M |
| resistor 62 | ohms | 2.2M |
| capacitor 63 | microfarads | 0.001 |
| resistor 64 | ohms | 27K |
| capacitor 65 | microfarads | 0.1 |
| resistor 66 | ohms | 10M |
| resistor 67 | ohms | 100K |
| resistor 71 | ohms | 47K |
| potentiometer 72 | ohms | 5K |
| transistor 30 | | T0108 |
| amplifier 50 | | Type 6BA11 |
| diode 70 | | silicon diode |

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. In a television receiver including signal amplifiers and a video processing channel developing composite video signals having a first sync and blanking interval indicative of carrier strength level and clamped at a fixed reference potential and a second image interval being representative of luminance information, automatic contrast control circuitry, including in combination:

gain control means including an amplifier device having an output and at least two input control electrodes, said output being coupled to selected ones of said signal amplifiers;

means coupled to said gain control means for the selective gating on thereof during which an output control voltage is developed at said output and applied to said signal amplifiers;

first circuit means coupled between the video processing channel and one of said gain control amplifier input electrodes for developing a first input signal responsive to amplitude excursions in the carrier strength level during the first interval of said signal source; and second circuit means coupled between the video processing channel and the other of said gain control amplifier input control electrodes for developing a second input signal responsive to the level of amplitude excursions in the luminance information during the second image interval of the composite video signals, said first and second input signals determining said output control voltage representative of both carrier strength and level of luminance information to selectively control the amplification of said selected signal amplifiers in response thereto.

2. Automatic contrast control circuitry in accordance with claim 1 wherein said second circuit means includes a storage device and fixed impedance means connected in parallel between said other amplifier input control electrode and a reference point, and means for charging said storage device to a predetermined level of substantially unidirectional potential at said one input control electrode, said second circuit means further including a voltage-dependent variable impedance means coupled between the video processing channel and said one input control electrode to provide a variable impedance path in parallel with said fixed impedance means, the instantaneous value of which in combination with said fixed impedance means determining the discharge rate of said storage device and in turn the level of said unidirectional potential.

3. Automatic contrast control circuitry in accordance with claim 1 wherein said gain control means is of the gated type and said amplifier device is a dual-section electron discharge device having pairs of separate anodes and suppressor electrodes, and common cathode, and control and screen electrodes, said gain control amplifier having one of said anodes coupled to said selected signal amplifiers, with the suppressor electrode associated with said one anode forming one of said amplifier input control electrodes and said common cathode forming the other of said amplifier input control electrodes.

4. Automatic contrast control circuitry in accordance with claim 2 wherein said voltage-dependent variable impedance means comprises a transistor having a base electrode coupled to the video processing channel, a collector electrode coupled to said one input control electrode and an emitter electrode coupled to said reference point through a limiting resistance.

5. Automatic contrast control circuitry in accordance with claim 2 wherein said storage device is a capacitor and wherein the means for the charging thereof includes the conduction of current through a portion of said gain control amplifier during a predetermined time interval of the composite video signal.

6. Automatic contrast control circuitry in accordance with claim 2 wherein said storage device and fixed impedance means are of selected values to form a substantially long RC time constant.

7. Automatic contrast control circuitry in accordance with claim 2 wherein said second circuit means further includes diode clamping means coupled between said one input control electrode of said gain control amplifier and a reference potential, and poled to conduct upon said storage device reaching a predetermined level of discharge so as to prevent overloading of said gain control amplifier device.

8. In a television receiver including signal amplifiers and a video processing channel developing composite video signals having a first sync and blanking interval clamped at a fixed reference potential and a second image interval representative of luminance information, automatic contrast control circuitry including in combination:

gain control means including an amplifier device having at least one input and at least one output coupled to selected ones of said signal amplifiers;

voltage supply means coupled to said gain control means for applying operating potential thereto;

means including a storage device and fixed impedance means connected in parallel between said input and a reference point and further including means for charging said storage device to a predetermined level of substantially unidirectional potential at said input; and circuit means including a voltage-dependent variable impedance means coupled between the video processing channel and said input for providing a variable impedance path in parallel with said fixed impedance means, the instantaneous value of which in combination with said fixed impedance means determines the discharge rate of said storage device and in turn the level of said unidirectional potential in response to the level of amplitude excursions in luminance information during the second image interval of the composite video signals, said gain control amplifier deriving an output control voltage in response to said applied input signals to selectively control the amplification of said selected signal amplifiers.

* * * * *